United States Patent [19]

James et al.

[11] 4,209,250
[45] Jun. 24, 1980

[54] SYSTEM FOR MAKING MULTIPLE ORIGINAL HOLOGRAMS OR COPIES OF A HOLOGRAM AND METHOD

[76] Inventors: Randall P. James, 30 Winfield St.; David C. Schmidt, 454 Shotwell St., both of San Francisco, Calif. 94110

[21] Appl. No.: 973,087

[22] Filed: Dec. 26, 1978

[51] Int. Cl.$^2$ .................... G03B 27/00; G03B 27/52
[52] U.S. Cl. ......................................... 355/18; 355/30
[58] Field of Search .................. 355/18, 77, 30, 32, 355/33, 50, 88, 103, 132, 64, 40, 41, 90

[56] References Cited

U.S. PATENT DOCUMENTS

| | | | |
|---|---|---|---|
| 1,709,320 | 4/1929 | Powers | 355/132 |
| 2,982,176 | 5/1961 | Kay | 355/40 |
| 3,408,144 | 10/1968 | Cowan | 355/18 UX |
| 3,488,121 | 1/1970 | Dassonville | 355/90 |
| 3,554,641 | 1/1971 | Jeffee et al. | 355/30 |
| 3,578,836 | 5/1971 | Hannan | 355/40 X |
| 3,614,223 | 10/1971 | Ott | 355/30 |
| 4,105,329 | 8/1978 | Carter et al. | 355/132 X |

FOREIGN PATENT DOCUMENTS

1225303  2/1960  France ......................................... 355/30

Primary Examiner—Donald A. Griffin
Attorney, Agent, or Firm—Flehr, Hohbach, Test, Albritton & Herbert

[57] ABSTRACT

A system for making multiple copies of a hologram or multiple original holograms on successive segments of a continuous length of blank film is disclosed herein. In the former case, this system includes two support arrangements, one for maintaining the original hologram in a fixed planar position and the other for maintaining the successive segments of blank film in a fixed copying position behind the original. In this particular system, the original hologram is held in place between two light transparent support plates, a front plate and a back plate, with the aid of a refractive index matching liquid and each successive segment of blank film is located across the back plate and maintained in a fixed position laterally therefrom solely by means of a continuous layer of preselected liquid substance which, at the same time, functions as an index matching medium. In the latter case or making original holograms, the original hologram just recited and its means for support would not be used.

22 Claims, 8 Drawing Figures

FIG_1

FIG_2

FIG_3

FIG_4

FIG__5A  FIG__5B

FIG__6  FIG__7

SYSTEM FOR MAKING MULTIPLE ORIGINAL HOLOGRAMS OR COPIES OF A HOLOGRAM AND METHOD

BACKGROUND OF THE INVENTION

The present invention relates generally to film copying systems and methods and more particularly to a system for and a method of making multiple copies of an original hologram or an original hologram itself on successive sements of a continuous length of blank film.

A system or method of the general type just recited is briefly described in APPLIED OPTICS, Vol. 5, No. 12, December 1966, p1945-1947 and in OPTICAL HOLOGRAPHY by Robert J. Collier et al, copyright 1971, p564-572, reference being made thereto. As described in the latter publication, it is important to support the hologram in a predetermined position relative to the light beam and it is important to support each successive segment of blank film (photographic emulsion) in a predetermined position relative to the hologram. In order to minimize optical distortion, the blank segment should be as close as possible to the hologram but laterally fixed relative thereto and undesirable light dispersion and reflection should be minimized as the beam passes through the two during the printing process. However, the systems which have been suggested heretofore and which applicants are familiar with, have not been completely satisfactory in this regard.

As one example, reference is made to a prior art copying system such as one disclosed in U.S. Pat. No. 3,716,268, where the hologram is supported in front of the film to be copied with its front face exposed directly to the incident beam) (or beams of light. While this exposed front face may appear perfectly smooth to the naked eye, it is more often than not quite irregular, at least relative to the wave length of the impinging light beam. As a result, the light does not pass through the hologram in an entirely predictable manner but rather is at least in part refracted in a somewhat random fashion as a result of the irregular surface thereby causing undesirable dispersion and contributing to the distortion referred to above. As will be seen hereinafter, the hologram disclosed herein is supported in a way which, from an optical standpoint, eliminates this relatively rough surface and therefore reduces distortion.

As an example of optical distortion resulting from improper support of the blank film to be copied, reference is made to a prior art copying system where the continuous length of blank film is supported in position laterally next to the hologram by mechanical means or as in the above-recited patent by means of vacuum. In those systems where the blank film is laterally supported mechanically, each segment of the film typically passes through a bath of indexing fluid and is thereafter positioned against a light transparent plate provided between the hologram and film. As the blank film segment moves up the back side of the support plate from the path, it is held in position by mechanical means such as the pressure plate. This mechanical method of supporting the blank film against the back plate has several drawbacks resulting in distortion. First, it causes distinct stress points as the film moves across the back plate which in turn produce high and low (laterally uneven) surfaces across the blank film. In most cases, the film will eventually return to its original planar configuration. However, if a copy of the hologram is made as the film returns to this stress-free configuration, which requires lateral movement of the film surface relative to the back plate and hologram, the reproduced image will most likely be distorted or, at least, its resolution will be compromised. Therefore, it is important to wait for this movement as well as all other movement adversely affecting image reproduction and/or resolution to subside. This period may be generally referred to as the "settling time" and with respect to movement caused by film strain, the settling time can take as long as 3 minutes, which of course slows down the overall process significantly.

The various disadvantages just discussed with respect to mechanical means of supporting the blank film laterally are equally applicable where the film is laterally supported by means of vacuum as described in the cited patent. This is because the same type of stress points may results. As will be seen hereinafter, in the system and method disclosed herein, the continuous length of blank film is supported to a back plate without utilizing vacuum or any mechanical means other than surface-tension and cohesive action of the index matching fluid itself. This eliminates the stress points discussed above and significantly reduces settling time as well as minimizing the possibility of abrasion.

OBJECTS AND SUMMARY OF THE INVENTION

One object of the present invention is to provide an uncomplicated and reliable system for and method of rapidly making multiple copies of a given image bearing film, specifically an original hologram in a preferred embodiment, or making multiple original holograms as another preferred embodiment on successive longitudinal segments of a continuous length of blank photographic emulsion film by optical means utilizing coherent light in the preferred embodiment.

Another object of the present invention is to provide an arrangement for and method of maintaining the original hologram or image bearing film generally in a predetermined planar position and particularly an arrangement which from an optical standpoint eliminates the relatively rough surfaces of the hologram for reducing distortion.

Still another object of the present invention is to provide an arrangement and method for supporting successive segments of the blank film in a predetermined position relative to the hologram or original object during the optical printing process and particularly to an arrangement and method which do not cause stress points in the film (reducing settling time) or abrasion to its surface during movement of the film.

As stated above, the present invention is directed to both a system for and method of making multiple copies of a given image bearing film or multiple original holograms on successive longitudinal segments of a continuous length of blank film. As will be discussed in more detail hereinafter, this is accomplished optically by utilizing a beam of electromagnetic radiation, specifically visible light which is preferably coherent, e.g. a laser, but which, in the case of making copies of a hologram, does not necessarily have to be coherent as discussed in OPTICAL HOLOGRAPHY cited above. The image bearing film which is an original hologram in a preferred embodiment, is supported in a predetermined planar position and specifically in a way which optically eliminates its relatively rough surfaces. A plate member having a specific index of refraction and transparent to the beam of electromagnetic radiation is fixedly located behind and in confronting relationship with the back surface of the image bearing film and, in a preferred embodiment, actually aids in supporting the film.

With the image bearing film supported in the manner described, the blank film, e.g. a photographic emulsion is moved intermittently along a path, a section of which extends across the back face of the plate member. This movement includes successive dwell periods during which the longitudinal film segments are successively positioned generally along a particular path section behind the plate member. After each of these segments moves into position along this path section, it is held laterally fixed with respect to the back face of the plate member and in a preferred embodiment, even during movement In accordance with the present invention, this is accomplished by means consisting essentially of a continuous layer of preselected liquid substance extending entirely across and contiguous with the confronting faces of the plate member and film. This preselected liquid substance has an index of refraction substantially the same as that of the plate member and hence also functions as an index matching medium.

DETAILED DESCRIPTION AND PREFERRED EMBODIMENTS

Figure 1:
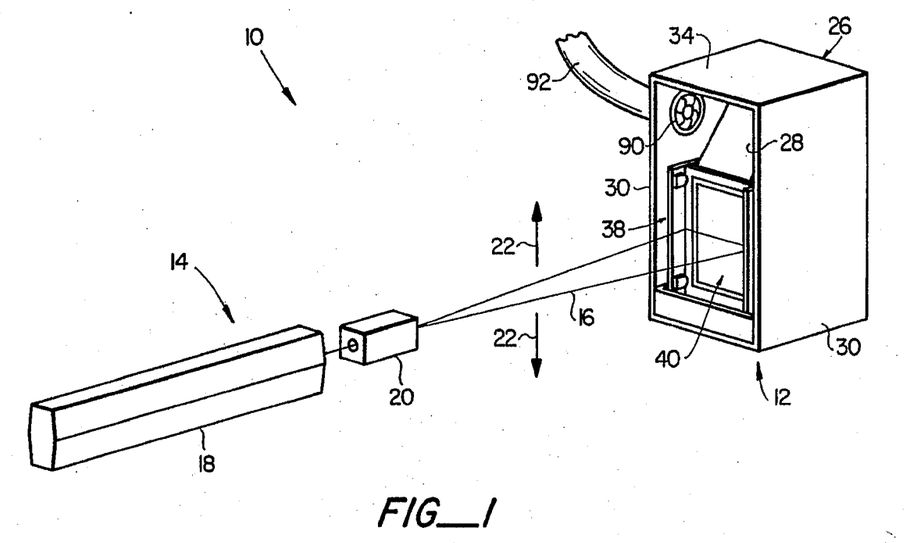
FIG. 1 is a perspective view of a system which is provided for making multiple copies of a given image bearing film, specifically an original hologram, which is constructed in accordance with the present invention.

Turning now to the drawings, wherein like components are designated by like reference numerals throughout the various figures, attention is specifically directed to FIG. 1. This figure illustrates a system 10 which is designed in accordance with the present invention and which, as will be seen, is provided for making multiple copies of an original hologram on successive segments of a continuous length of blank photographic emulsion film. This is accomplished by means of optical printing which requires passing a beam of visible light, preferably coherent light, through the hologram and an appropriately positioned segment of the blank film. As a result, overall system 10 includes an assembly 12 for supporting both the original hologram and a continuous length of blank film as well as a system 14 for producing a laser beam of visible light generally indicated at 16.

At the outset, it is to be understood that the optical printing technique utilized by system 10 in making multiple copies of the original hologram is a conventional technique in and by itself and, hence, will not be discussed in detail here. In order to more fully appreciate the present invention, it should suffice to say that this technique requires accurate predetermined positioning of the hologram and film segment to be copied as beam 16 passes through both. In a typical arrangement, the film segment to be copied is located directly behind the hologram as close as possible to the latter, while the light beam scans across and passes through the hologram and then the film segment being copied.

As illustrated in FIG. 1, beam producing arrangement 14 includes both a beam generating apparatus 18 and a cooperating scanning device 20 which also shapes beam 16 into the configuration illustrated, that is, into a configuration that is collimated or at least approximates a collimated beam. Device 20 causes the beam to scan in the generally vertical direction as indicated by arrows 22 for vertically scanning the front face of the hologram. In this regard the hologram which will be discussed in more detail hereinafter is generally designated at 24 (see FIG. 5) and, as illustrated in FIG. 1, is supported within assembly 12 so that its front face 24a is in an exposed, confronting position with respect to beam 16. Moreover, it is to be understood that scanning is not necessary and device 20 would not be used if beam 16 is of sufficient intensity to provide adequate exposure of the entire area being exposed simultaneously, as is well known.

The optical printing technique which has been very briefly described is a conventional one, as stated. Moreover, the beam generating apparatus 18 and its associated bean scanning and shaping device 20 are both conventional and may be readily provided by those with ordinary skill in the art. In addition, where arrangement 14 requires other conventional components dictated by the particular optical printing technique being utilized including the particular type and shape of beam being provided and the manner in which it is being scanned, these additional components can also be readily provided. The particular wavelength of beam 16 will in large part depend on the particular original being copied and the copy material but, in any event, may be readily determined. In an actual working embodiment of the present invention, beam 16 has a wavelength of about 6328 angstroms.

While the optical printing technique is conventional, the particular angles at which the beam impinges the front surface 24a of hologram 24 is conventional but critical. More specifically, it has been found that the resolution of reproduction can be maximized by passing beam 16 through the hologram and film segment to be copied at a particular angle. In this regard, both the hologram and film segment to be copied are planar and supported within adjacent vertical planes, as will be seen hereinafter. Moreover, as will also be seen, the film segment to be copied is located directly behind the hologram in a laterally fixed position relative thereto during the optical printing operation. Based on this positional relationship, it has been found that the resolution can be maximized when horizontally extending beam 16 impinges planar surface 24a of the hologram at an angle which approximates the object or reference beam reconstruction angle of the original hologram. This angle is adjusted for maximum diffraction efficiency.

Figure 2:
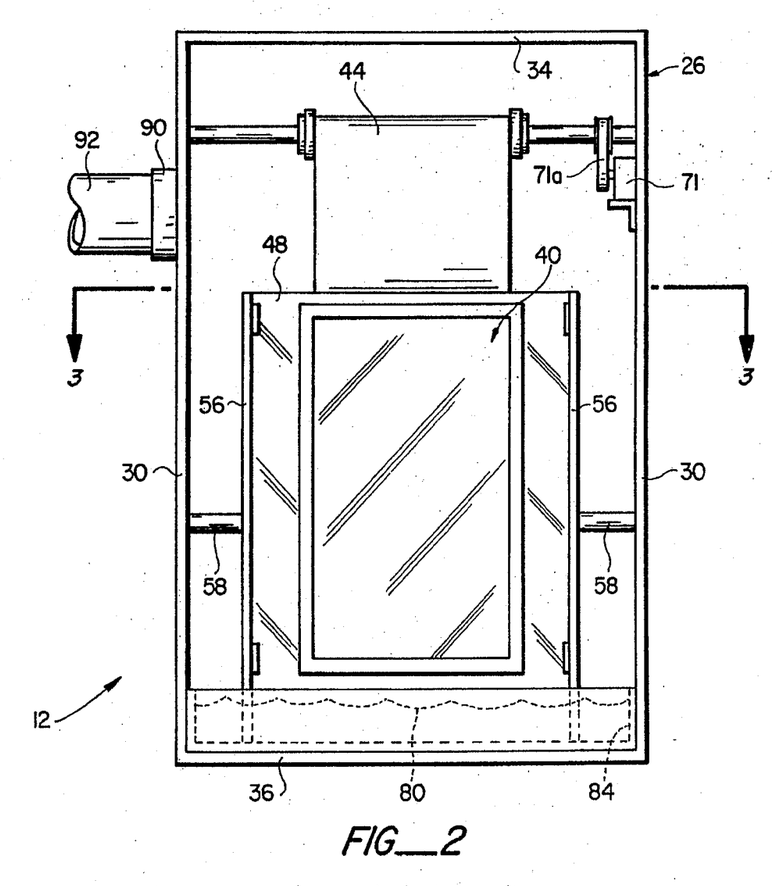
FIG. 2 is a front elevational view of a support assembly comprising part of the system illustrated in FIG. 1.

Having described system 10 generally, attention is now directed specifically to support assembly 12. As illustrated best in FIGS. 2, 3 and 4 in conjunction with FIG. 1, assembly 12 includes an overall housing 26 having a front opening 28 but which is otherwise closed by means of two vertical side panels 30, a vertical back panel 32, and top and bottom panels 34 and 36, respectively. These various panels together define an inner compartment 38 which contains a first arrangement 40 and a second arrangement 42. Arrangement 40 maintains original hologram 24 in a predetermined planar position extending vertically across opening 28 and second arrangement 42 supports a continuous length of blank film in a manner to be described. This film which is generally indicated at 44 is of any conventional type used in the reproduction of holograms. For example, in the actual working embodiment, film 44 and the hologram are identical in construction, each being constructed of conventional holographic material such as KODAK S0173 type film. However, it is important to note that the present invention is not limited to the multiple duplication of holograms specifically and may be incorporated into other systems which provide for the copying of any given image bearing film on successive segments of a continuous length of blank film. This of course means that various aspects of overall system 10 may vary depending upon the particular type of film being reproduced. However, one with ordinary skill in the art based on the teachings herein could readily modify system 10 to be compatable with the particular copying process being carried out and particular film used.

Figure 5A:
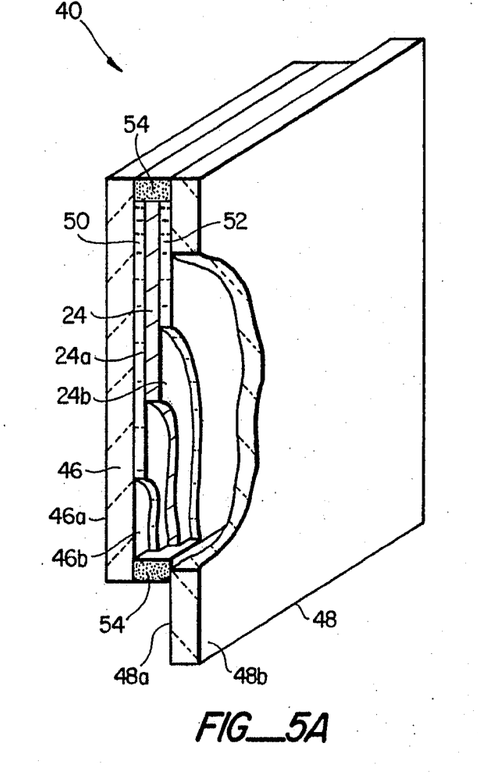
FIGS. 5A and 5B are partially broken away perspective view views of a hologram support arrangement comprising part of the assembly illustrated in FIGS. 2, 3 and 4.
Figure 5B:
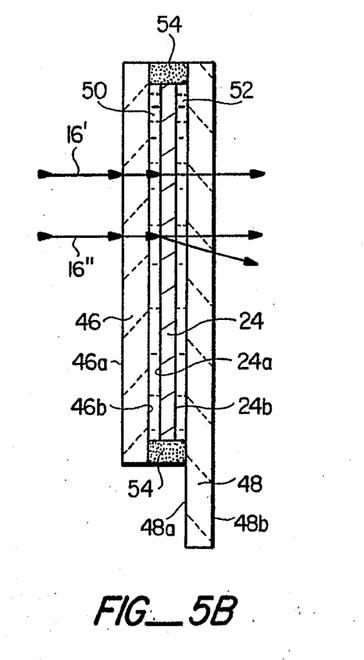

As illustrated best in FIGS. 5a and 5b, hologram support arrangement 40 is shown supporting hologram 24 in a planar, vertically extending position. This arrangement includes a front light transparent plate member 46 and a back light transparent plate member 48, both of which are preferably constructed of clear glass. In this regard, the refractive index of the glass is selected to approximate that of the holographic film. As seen best in FIG. 5b, front plate member 46 which has a front face 46a and a back face 46b is located in front of and in confronting relationship with the front face 24a of hologram 24 and is slightly larger than the hologram so as to extend slightly beyond each side of the latter. In a similar manner, back plate member 48 which has a front side 48a and a back side 48b is located in back of and in confronting relationship with the back face 24b of the hologram. Moreover, back plate member 48 is slightly wider than hologram 24 in the horizontal direction but for reasons to become apparent hereinafter is significantly longer than the hologram in the vertical direction.

Arrangement 40 also includes two layers 50 and 52 of light transparent liquid substance having substantially the same index of refraction as the plate members. In an actual working embodiment, the liquid substance is perchloethylene having an index of refraction of approximately 1.5053 while the plate members, as stated, are constructed of glass and have an index of refraction of between 1.49 and 1.51. As seen best in FIG. 5b, layer 50 extends entirely across and is contiguous with the confronting surfaces 46b and 24a of plate member 46 and hologram 24 while layer 52 extends entirely across and is contiguous with faces 24b and 48a of the hologram and back plate. These layers of liquid substance are sealed in place by a continuous bead of suitable sealing means 54, specifically epoxy in the preferred embodiment. This bead of epoxy extends entirely around the hologram between confronting outer circumferential portions of the two glass plates, as best seen in FIG. 5a.

Arrangement 40 for supporting hologram 24 in the position shown may be assembled in any suitable manner. However, in an actual and preferred embodiment, the hologram is first passed through a bath of the liquid substance used to form layers 50 and 52 and thereafter placed in position between the two glass plates. The liquid substance itself will be discussed in more detail hereinafter with respect to film support arrangement 42. However, for the moment it suffices to say that the liquid substance once applied to both sides of the hologram film and positioned between the two plates is capable of maintaining its layered configuration and holding the hologram in place laterally between the glass plates for a sufficient period of time to allow epoxy bead 54 to be provided. In this regard, before application of the epoxy bead, the entire configuration including the two plates, hologram and supporting layers of liquid substance is placed horizontally on its back, that is, on back surface 48b of the plate member 48 and allowed to settle so that any excess liquid substance drains out between the two glass plates, thereby providing uniform thickness across each layer. In this regard, the front plate serves to flatten the original hologram. Thereafter, these layers are sealed in place by means of epoxy bead 54.

Arrangement 40 is not only provided for supporting hologram 24 in the vertical, planar position illustrated, but it also provides complete index matching between the hologram and impinging light beam 16. More specifically, as illustrated in FIG. 5b, as an incoming ray of beam 16 indicated at 16′ first enters arrangement 40, it initially impinges a relatively smooth planar surface, specifically surface 46a of glass plate 46. Hence, if any refraction is to take place, it will do so in a predictable manner in accordance with the index of refraction of the glass plate and not as a result of a rough surface. For purposes of explanation, let it be assumed that ray 16′ enters the arrangement in a direction normal to plate 46. As a result, no refraction will take place at all and the ray will pass unaltered in direction through the front plate and layer 50 of the liquid substance which has a refractive index close to that of the plate. Moreover, in a preferred and actual working embodiment, this index of refraction is chosen to be substantially equal to the non-image bearing areas of hologram 24. Accordingly, ray 16′ will pass unaltered in direction through the non-image bearing portion, liquid substance layer 52 and back plate member 48, as seen in FIG. 5b. On the other hand, where a light ray 16″ passes through an image bearing portion of the hologram, the latter will cause one portion of the light ray to be refracted while another portion passes therethrough unaltered in direction, as indicated in FIG. 5b. In either case, the way which the light passes through arrangement 40 is predictable. Most irregularities in the surfaces of the hologram are optically eliminated by means of layers 50 and 52 and hence unwanted light dispersion from either the front or back face of the hologram is eliminated.

Returning to FIGS. 2 to 4, it can be seen that arrangement 40 is held in a vertically disposed position in compartment 38 near the bottom of opening 28. This is accomplished by means of two vertically disposed bracket plates 56 held in place by rods 58 connecting the brackets to side panels 30. As illustrated best in FIG. 4, with arrangement 40 in this position, a bottom portion of plate member 48 extends down to bottom panel 36. As will be seen hereinafter, this bottom portion is provided for receiving film 44 during movement of the latter.

Figure 3:
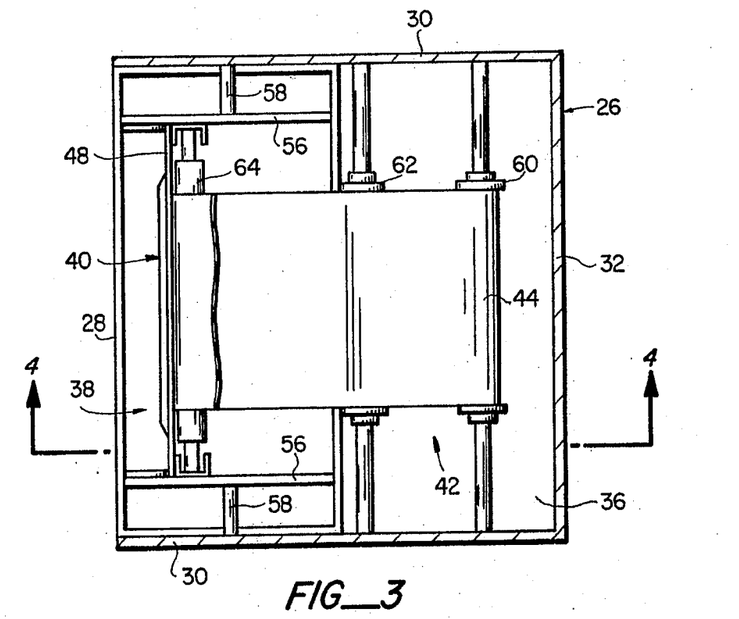
FIG. 3 is a horizontal sectional view of the assembly illustrated in FIG. 2, taken generally along line 3—3 in FIG. 2.
Figure 4:
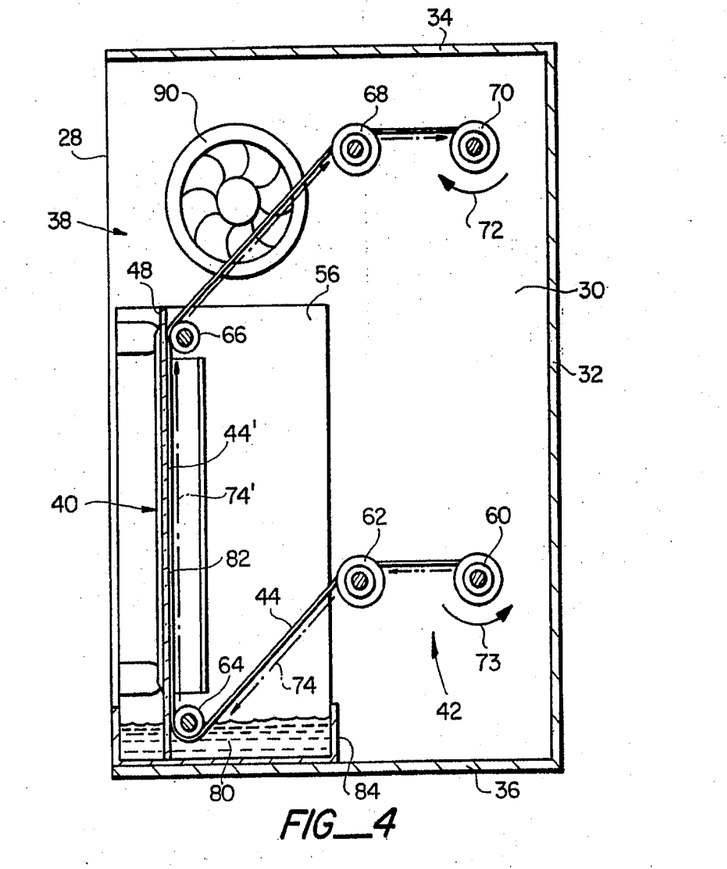
FIG. 4 is a vertical sectional view of the assembly illustrated in FIG. 2, taken generally along line 4—4 in FIG. 3.

Having described arrangement 40 comprising part of support assembly 12, attention is now directed to the continuous film supporting arrangement 42. As best seen in FIGS. 3 and 4, this arrangement includes a series of rolls and rollers horizontally supported between side panels 30 including a feed roll 60, lower support rollers 62 and 64, upper support rollers 66 and 68, and takeup roll 70. A drive motor 71 is operatively connected through a gear and drive belt arrangement 71a with the takeup roll for rotating the latter in the direction of arrow 72 which causes feed roll 28 to rotate in the direction of arrow 73. These rolls and rollers along with the operatively connected motor support the continuous length of blank film along a path generally indicated by arrows 74 in FIG. 4.

As seen in FIG. 4, path 74 extends from the feed roll horizontally over support roller 62 and downwardly at an angle past the underside of support roller 64. Thereafter, path 74 defines a path section 74' which extends substantially vertically across the back face 48b of plate member 48. From section 74', the path 74 continues up and over support roller 68 and finally horizontally to takeup roll 70. As will be discussed hereinafter, during operation of system 10, continuous film 44 is intermittently moved along path 74 by means of drive motor 71. This movement includes successive dwell periods during which segments of blank film are successively positioned generally along path section 74'. As a result, each of these film segments, indicated at 44', is positioned in a generally vertically confronting relationship with back surface 48b of back plate member 48, as best seen in FIG. 4.

As will be discussed in more detail hereinafter, as each film segment 44' moves into position behind back plate 48 and hence behind hologram 24, the previously described scanning movement of light beam 16 is initiated for copying the hologram image on the rearwardly located film segment. However, in order to minimize distortion and maximize resolution, it is important to maintain the film segment in a fixed position laterally with back face 48b of plate 48 during the dwell period or at least during the scanning period of beam 16. As stated previously, in the past this has been carried out by means of vacuum between the hologram and film or mechanically by applying a biasing plate or other such means against the film while at the same time providing an index matching liquid between the hologram and film or the plate member (corresponding to plate member 48) and film. However, in accordance with the present invention, both vacuum and a mechanical arrangement of this type or any other type are eliminated. Rather, film segment 44' is maintained in a fixed position laterally with the back face of plate member 48 solely by means consisting essentially of a liquid substance 80 in the form of layer 82 extending entirely across and contiguous with the confronting faces of plate member 48 and film segment 44' during the dwell period and, as will be discussed hereinafter, also during the period when film 44 moves along path 74. While liquid substance 80 will be described in detail hereinafter, for the moment it should suffice to say that this substance has an index of refraction substantially the same as plate members 46 and 48 as well as the non image bearing portion of hologram and blank film 44 which is selected to have the same index. Moreover, substance 80 is preferably used to form previously described layers 50 and 52 comprising part of arrangement 40.

Figure 6:
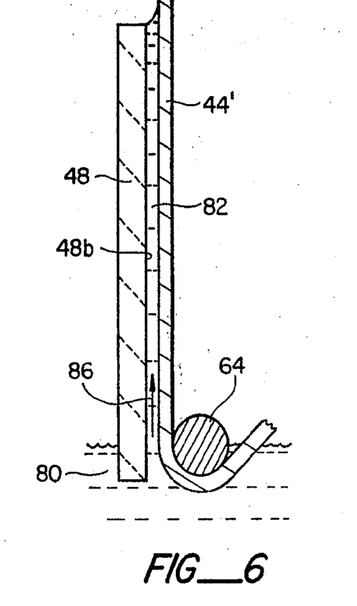
FIG. 6 is an enlarged vertical sectional view of one part of a blank film supporting arrangement used in copying the hologram.

As illustrated best in FIG. 4 in conjunction with FIG. 6, a supply of liquid substance 80 is provided within a container or bath 84 supported on bottom panel 36 adjacent opening 28 into compartment 38. With the container in this position, it can be seen that the lowermost portion of back plate member 48 extends into the bath of liquid substance as does the bottom portion of support roller 64. Accordingly, as film 44 moves along path 74 it passes through the bath of liquid substance 80 and, because of certain characteristics of this substance to be described, layer 82 is formed on its front face and actually maintains the film in a fixed lateral position in confronting relationship with the back face of plate member 48 and spaced laterally therefrom a fixed distance equal to its thickness. In an actual working embodiment, the liquid substance is selected not only to maintain this lateral positional relationship for a period of time equal to dwell period but also during movement of the film between dwell periods. In this regard, each time a new film segment 44' moves into position behind back plate 48, liquid substance layer 82 is replenished, as best seen in FIG. 6. In order to provide a layer 82 continuously, it is only necessary that any given layer be capable of maintaining its integrity during a given dwell period and while the film moves between that dwell period and the next dwell period. In an actual working embodiment, a given dwell period is between about 5 and 10 seconds while movement between dwell periods is about 10 seconds.

As described above, layer 82 of liquid substance 80 is formed by passing film 44 through a bath of the liquid substance in container 84 which includes a conventional particle filter (not shown). The liquid substance is initially carried up between plate member 48 and film 44, as indicated by arrow 86 in FIG. 6. The amount of liquid substance initially carried up between the plate member and the film is in excess of that which is naturally required to laterally hold film segment 44 against plate member 48. However, this excess amount of liquid substance will drain back down into container 84 over a predetermined period of time depending upon the characteristics of the liquid substance and the final thickness of layer 82 as dictated by the gap between back plate 48 and the film. This is in turn dictated by the positions of rollers 64 and 66 relative to the back plate and the thickness of the film itself. In this regard, in an actual working embodiment, layer 82 is approximately equal in thickness to that of film 44, although this is very difficult to measure. In any event, with the liquid substance utilized in the actual working embodiment of the present invention, which substance will be described below, it takes approximately 10 seconds after the starting of a dwell period before all of the excess liquid substance returns to container 84. At this time, layer 82 is uniform and static and holds film segment 44' uniformly in place laterally with respect to plate member 48 without requiring any mechanical means. Moreover, since this layer extends contiguously between plate 48 and film segment 44' and since its refractive index is the same or approximately the same as that of the plate of film 44, it also acts as an index matching medium.

The way in which liquid substance 80 forms layer 82 and functions to maintain a lateral relationship between plate member 48 and film segment 44' has been described above. The exact theory underlying this physical phenomena which allows liquid layer 82 to support film segment 44' by itself is not entirely understood. However, based on the interaction between the molecules of liquids and those of solid surfaces, it is known that a given liquid substance displays a particular surface tension. Further, when the liquid interacts with a given solid surface certain adhesion forces relating to that liquid and its interaction with that solid surface develop between the two. By carefully selecting the liquid substance based on its surface tension and the adhesion forces which result between blank film 44 and plate member 48, previously described layer 82 can be readily provided.

In order to allow the film to move along previously described path section 74' while at the same time maintaining the integrity of layer 82, the viscosity of the particular liquid substance selected is also important. More specifically, its viscosity must be sufficiently low to allow movement of the film in a vertical direction while the layer 82 retains its lateral integrity. Of course, the liquid substance must have an index of refraction approximately equal to that of plate member 48 and the other pertinent components of system 10. In addition, the evaporation temperature of the liquid substance is preferably sufficient to allow most if not all of the liquid substance on film 44 above roller 66 (above film section 44') to evaporate before it reaches takeup roll 70. In this regard, support assembly 12 preferably includes an exhaust fan 90 located in the top of side panel 30 near the top front end of compartment 38 and an exhaust 92 for exhausting the fumes in the compartment to a remote location.

In view of the foregoing, it should be apparent that selection of a particular liquid substance which will function in the manner described requires selecting a substance having the proper coefficient of surface tension, viscosity, index of refraction, absorption coefficient and evaporation temperature and, ultimately, one which properly interacts with the particular plate member 48 and film 44 selected to provide the adhesion forces (or other such forces) necessary to maintain the positional relationship described. In this regard, selection of the right liquid substance at least in part may be a matter of trial and error, but must nevertheless be based on the criteria set forth herein and to a certain article. Reference is made to that article which is in the JOURNAL OF THE SMPTE, October 1958, Vol. 57, entitled "Printing Motion Picture Films Emmersed In A Liquid, Part III: Evaluation of Liquids", p678–686. In an actual working embodiment of the present invention, two different substances have been used with success. The first of these two substances is perchlorethylene and has the following characteristics:

| | |
|---|---|
| coefficient of surface tension | 32.3 dynes/cm at 68° F. |
| viscosity | 0.88 cps at 20° C. |
| evaporation temperature | 0.15 gal/ft²/day at 77° F. |
| index of refraction | 1.5053 |

The second of these two substances is trichlorethane and has the following characteristics:

| | |
|---|---|
| coefficient of surface tension | 25.9 dynes/cm at 68° F. |
| viscosity | 0.735 cps at 25° C. |
| evaporation temperature | 0.6 gal/ft²/day at 77° F. |
| index of refraction | 1.4379 |

It is to be understood that these two substances just described are provided for examplary purposes only and are not intended to limit the invention. One with ordinary skill in the art could readily select an appropriate substance for use in the present invention based on the disclosure herein.

Having described assembly 12 including support arrangements 40 and 42, attention is now directed to the way in which system 10 operates in accordance with the present invention. Initially, the first copy of hologram 24 to be produced from segment 44' is moved through bath 80 and into position behind plate member 44 and hence behind hologram 24. At this point in time, movement of the film is stopped, thereby initiating the first dwell period. However, beam 16 does not begin scanning the front face of the hologram until all internal movement within assembly 12 effecting the quality of reproduction has stopped, that is, until the end of the settling time. In the case of the present invention, this settling time is about 5 to 10 seconds which includes the time necessary to allow layer 82 of liquid substance 80 to drain and reach a static state. Thereafter, beam 16 is moved vertically across face 24a of hologram 24 from its top edge to its bottom edge at the previously described angle. In an actual working embodiment, this takes approximately one-half second whereupon the next successive film segment is moved into position behind the hologram which takes about 10 seconds. Therefore, the entire dwell time (settling time plus scanning time) is approximately 10 to 11 seconds and the total reproduction time (dwell time plus film movement time) is approximately 15 to 20 seconds.

Figure 7:
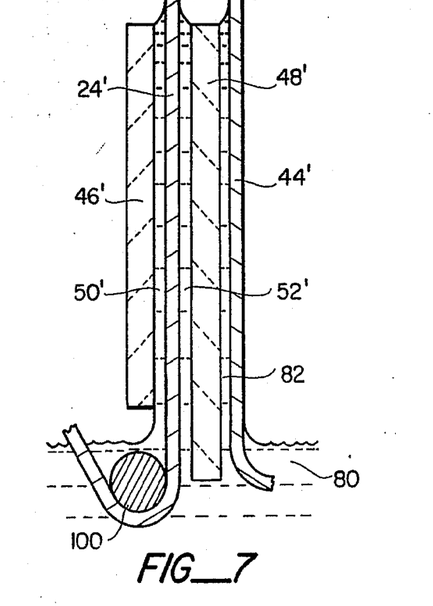
FIG. 7 is an enlarged vertical sectional view illustrating the blank film support arrangement of FIG. 6 in combination with a modified hologram support arrangement.

In the embodiment specifically illustrated in FIGS. 1 to 6, hologram 24 is fixedly sealed in place throughout the entire multiple copying process. While this is preferred, it is possible to quickly and readily interchange originals as best illustrated in FIG. 7. As seen in this figure, an original hologram 24' comprises one longitudinal segment of a continuous length of holographic film made up of a number of such segments. Like previously described hologram 24, segment 24' is held between two identical plate members 46' and 48' and identical liquid substance layers 50' and 52'. However, the hologram and liquid substance layers illustrated in FIG. 7 are not sealed between plate members 46' and 48'. Rather, segment 24' is moved between the two plate members and the liquid substance layers 50' and 52' are formed in the same manner as previously described layer 82 illustrated in FIG. 6. The only difference between the layers is that hologram segment 24' is held laterally between two plates by two layers of liquid substance whereas the previously described film segment 44' is held laterally in place by only one layer, specifically layer 82. While not shown, the means for moving the various segments 24' of hologram film would be similar to support arrangement 42 and hence would include a feed roll, a takeup roll and a plurality of support rollers including the roller 100 illustrated in FIG. 7 which is entirely submerged in a bath of liquid substance 80. In this embodiment, film segment 44' is held in place against the back face of plate member 48' in the same manner described with respect to FIGS. 4 and 6 and hence will not be described further herein. From an operational standpoint, this embodiment will function in the same manner as the previously described embodiment in FIGS. 1-6, with one exception. Rather than manually replacing one original hologram with another, replacement is done automatically at a substantially faster rate.

Arrangement 42 comprising part of overall system 10, as described above serves to support a continuous length of film 44 to be made into multiple copies of an original hologram 24. However, it is to be understood that arrangement 42 could support a continuous film to be made into original holograms. In this case, the original film would be supported by arrangement 42 in the same way as continuous film 44. Of course the original film may be of a different type than the copy film. In addition, the overall system for making the original would be different than system 10 to the extent it would not include original hologram 24 or arrangement 40 (with the exception of backplate 48). Rather, the beam 16 would cooperate with the actual object (either a physical object or the optical image of an object) to be made into a hologram and the original film for converting the latter into a hologram. The exact way in which this is done, once a segment of the original film is positioned against plate 48 (now comprising part of arrangement 42), is conventional and will not be described herein. In fact, the positional relationship between the film, object (actual or hologram) and the beam and the way these components cooperate to make an original hologram or copy can be readily provided by those with ordinary skill in the art, depending on the particular type of hologram being made.

What is claimed is:

1. A system for making multiple copies of a given image bearing film on successive longitudinal segments of a continuous length of blank film, said system comprising:

(a) means for producing a beam of electromagnetic radiation capable of passing through and interacting with said given image bearing film and said blank film during predetermined exposure periods when the two are held in predetermined positions relative to one another for copying the image from the given film onto the blank film;
    (b) means for supporting said image bearing film in a predetermined planar position;
    (c) a plate member fixedly located behind and in confronting relationship with the back face of said image bearing film, said plate member having a predetermined index of refraction and being transparent to said beam to allow passage of said beam therethrough;
    (d) means for providing intermittent movement of said continuous length of blank film along a path, a section of which extends across the back face of said plate member, said movement including successive dwell periods including said exposure periods during which said longitudinal segments of said blank film are successively positioned generally along said path section;
    (e) means for successively maintaining said segments in a fixed position laterally with the back face of said plate member during at least portions of said dwell periods, including said exposure periods said position maintaining means consisting essentially of a layer of a preselected liquid substance which has an index of refraction at least approximately equal to the index of refraction of said plate member and which extends entirely across and contiguous with the confronting faces of each film segment and said plate member during the exposure period of a corresponding dwell period for maintaining each of said segments in said fixed lateral position during at least the exposure period in its corresponding dwell period, said liquid layer remaining static during said exposure periods of said dwell periods
    (f) means for providing each of said layers of liquid substance; and
    (g) means for directing said beam onto the front face of said image bearing film during each of said exposure periods for providing said multiple copies.

2. A system according to claim 1 wherein said path section extends in a substantially vertical direction from a bottom edge portion of said plate member towards a top edge portion thereof and wherein said layer providing means includes a container of said liquid substance located in a predetermined position near said bottom edge position such that said blank film passes into the liquid substance within said container prior to moving into said path section whereby to provide said liquid substance layers.

3. A system according to claim 2 wherein said liquid substance is of a type which forms a continuous layer extending entirely across and contiguous with the confronting faces of said blank film and the backside of said plate member as said blank film moves along said path section, whereby to maintain said lateral position between said blank film and said back plate member while, at the same time, allowing said blank film to move along said path section at a predetermined speed.

4. A system according to claim 3 wherein said liquid substance is one selected from the group consisting of perchloroethylene and trichlorethane.

5. A system according to claim 1 wherein said beam of electromagnetic radiation is visible light.

6. A system according to claim 1 wherein said image bearing film is a hologram and wherein said blank film is holographic film for making multiple copies of said hologram.

7. A system according to claim 1 wherein said means for supporting said image bearing film includes
    (i) said plate member,
    (ii) a second substantially identical plate member fixedly located in front of and in confronting relationship with the front face of said image bearing film,
    (ii) a first layer of liquid substance having substantially the same index of refraction as said plate members and extending entirely across and contiguous with the confronting faces of said image bearing film and said first-mentioned plate member, and
    (iv) a second layer of liquid substance having an identical index of refraction and extending entirely across and contiguous with the confronting faces of said image bearing film and said second plate member.

8. A system according to claim 7 wherein said supporting means includes means for sealing said first and second layers of liquid substance in position between said plate members and said image bearing film.

9. A system according to claim 7 wherein said image bearing film comprises one segment of continuous film which includes successive longitudinal segments, each displaying a different image and wherein said means for supporting said image bearing film includes means for intermittently moving said last-mentioned film in a predetermined way so as to intermittantly position said segments in said predetermined planar position between said plates and first and second layers of liquid substance.

10. A system according to claim 9 including means for continuously providing said first and second layers of liquid substance.

11. A system according to claim 1 wherein said image bearing film has a predetermined object beam reconstruction angle and wherein said beam directing means scans said beam across the front face of said image bearing film during said dwell periods at an angle approximately equal to said reconstruction angle.

12. In a system for making multiple copies of an original hologram on successive segments of a continuous length of blank holographic film by means of optical printing utilizing a visible beam of light, a support assembly comprising:
   (a) a first arrangement for maintaining said original hologram in a predetermined planar position extending substantially vertically, said arrangement including
      (i) first and second light transparent plate members fixedly located on the front and back sides of and in confronting relationship with the front and back faces of said hologram, respectively, said plate members having the same index of refraction,
      (ii) first and second layers of light transparent liquid substance having substantially the same index of refraction as said plate members and respectively extending entirely across and contiguous with the confronting faces of said hologram and said plate members, and
      (iii) means for sealing said first and second layers in position between said hologram and said plate members;
   (b) a second arrangement including
      (i) means for supporting said continuous length of blank holographic film along a path, a section of which extends substantially vertically across the back face of said second plate member, and
      (ii) means for providing predetermined intermittent movement of said film along said path, said movement including successive dwell periods during which said segments of blank film are successively positioned generally along said path section;
   (c) means for successively maintaining said film segments in a fixed position laterally with the back face of said second plate member during said dwell periods and during movement of said film along said path section between said dwell periods, said position maintaining means consisting essentially of a continuous layer of preselected liquid substance which has an index of refraction at least approximately equal to the index of refraction of said plate members and which extends entirely across and contiguous with the confronting faces of said second plate member and said film during said dwell periods and as said film moves between dwell periods for maintaining said lateral position while having a viscosity which at the same time allows the film to move along said path section at a predetermined speed said liquid layer remaining static during portions of said dwell periods; and
   (d) a container of said preselected liquid substance for providing said last mentioned layer, said container being located in a predetermined position near the bottom of said path section such that said film passes into the liquid substance within said container prior to moving into said path section.

13. An assembly according to claim 12 wherein said preselected liquid substance has a viscosity of about 0.88 cps at 20° C. and said predetermined index of refraction is about 1.5053.

14. An assembly according to claim 12 wherein said preselected liquid substance has a viscosity of about 0.735 cps at 25° C. and said predetermined index of refraction is about 1.4379.

15. An assembly according to claim 12 wherein said liquid substance is of the type displaying sufficient surface tension and adhesive force when contacting the confronting faces of said film and second plate to maintain said lateral position of the two while having a viscosity which at the same time allows the film to move along said path section at a predetermined speed.

16. In a system for making multiple copies of an original hologram on successive segments of a continuous length of blank holographic film by means of optical printing utilizing a visible beam of light, an assembly for supporting said blank film comprising:
   (a) a fixed support plate located behind said original hologram;
   (b) means for moving said film along a path, a section of which extends generally along the back face of said plate; and
   (c) means for maintaining said film in a predetermined position laterally with respect to said back face as said film passes through said path section, said maintaining means consisting essentially of a preselected liquid substance which is maintained entirely across and contiguous with said film and said back face and which in and by itself maintains said film in said lateral position during said movement.

17. A method of making multiple copies of a given image bearing film on successive longitudinal segments of a continuous length of blank film, said method comprising:
   (a) producing a beam of light radiation capable of passing through and interacting with said given image bearing film and said blank film during predetermined exposure periods when the two are held in predetermined positions relative to one another for copying the image from the given film onto the blank film;
   (b) supporting said image bearing film in a predetermined planar position in front of a plate member such that the latter is fixedly located behind and in confronting relationship with the back face of said image bearing film, said plate member having a predetermined index of refraction and being transparent to said beam of light to allow passage of the latter therethrough;
   (c) providing intermittent movement of said continuous length of blank film along a path, a section of which extends across the back face of said plate member, said movement including successive dwell periods including said exposure periods during which said longitudinal segments of said blank film are successively positioned generally along said path section;
   (d) maintaining said segments in a fixed position laterally with the back face of said plate member during at least portions of said dwell periods, including said exposure periods substantially solely by means of layers of a preselected liquid substance which has an index of refraction approximately equal to the index of refraction of said plate member and which extends entirely across and contiguous with the confronting faces of said film segments and said plate member during the exposure period of its corresponding dwell period, said liquid substance remaining static during the exposure periods of said dwell periods; and (e) directing said beam onto the front face of said image bearing film during said exposure periods for providing said multiple copies.

18. A method according to claim 17 wherein said path section extends in a substantially vertical direction from a bottom edge portion of said plate member towards a top edge portion thereof and wherein a container of said liquid substance is located in a predetermined position near said bottom edge position, said method including passing said blank film into the liquid substance within said container prior to it moving into said path section whereby to provide said liquid substance layers.

19. A method according to claim 17 wherein said image bearing film comprises one segment of a continuous film which includes successive longitudinal segments, each displaying a different image, said method including moving said image bearing film in a predetermined way so as to intermittantly position said segments in said predetermined planar position.

20. A method according to claim 17 wherein said image bearing film has a predetermined object beam reconstruction angle and wherein said beam directing means scans said beam across the front face of said image bearing film during said dwell periods at an angle approximately equal to said reconstruction angle.

21. A method according to claim 17 wherein said liquid substance is of a type displaying sufficient surface tension and adhesive force when contacting the confronting faces of said film seguments and plate member to maintain the lateral position of the two while having a viscosity which at the same time allows the film to move along said path section at a predetermined speed.

22. In a system for making original holograms or copies of an original hologram on successive longitudinal segments of a continuous length of blank film during predetermined exposure periods, an arrangement for supporting said film comprising:

(a) a plate member fixedly located in a predetermined position;

(b) means for providing intermittent movement of said continuous length of blank film along a path, a section of which extends across the back face of said plate member, said movement including successive dwell periods including said exposure periods during which said longitudinal segments of said blank film are successively positioned generally along said path section;

(c) means for successively maintaining said segments in a fixed position laterally with the back face of said plate member during at least the exposure periods of said dwell periods, said position maintaining means consisting essentially of a layer of a preselected liquid substance which has an index of refraction at least approximately equal to the index of refraction of said plate member and which extends entirely across and continuous with the confronting faces of each film segment and said plate member during the exposure period of a corresponding dwell period for maintaining each of said segments in said fixed lateral position during the exposure period of its corresponding dwell period, and (d) means for providing each of said layers of liquid substance.

* * * * *